United States Patent
Mishra et al.

(10) Patent No.: US 10,185,892 B1
(45) Date of Patent: Jan. 22, 2019

(54) AUTOMATIC LARGE-SCALE IMAGING DEVICE DIAGNOSTICS

(71) Applicant: Amazon Technologies, Inc., Reno, NV (US)

(72) Inventors: Pragyana K. Mishra, Seattle, WA (US); David Joseph Rendleman, Seattle, WA (US); Jonathan Robert Dughi, Seattle, WA (US); Danny Guan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1098 days.

(21) Appl. No.: 14/291,086

(22) Filed: May 30, 2014

(51) Int. Cl.
*H04N 7/18* (2006.01)
*G06K 9/62* (2006.01)
*G06K 9/66* (2006.01)
*H04N 17/00* (2006.01)

(52) U.S. Cl.
CPC ............. *G06K 9/6256* (2013.01); *G06K 9/66* (2013.01); *H04N 17/002* (2013.01)

(58) Field of Classification Search
CPC ....... G06K 9/6256; G06K 9/66; H04N 17/002
USPC ......................................................... 348/159
See application file for complete search history.

(56) References Cited

U.S. PATENT DOCUMENTS

| | | | | |
|---|---|---|---|---|
| 2006/0044390 A1* | 3/2006 | Ono | ....................... | G06T 1/0007 348/143 |
| 2006/0081135 A1* | 4/2006 | Britton | ..................... | A21B 7/00 99/486 |
| 2011/0145175 A1* | 6/2011 | Agarwal | .............. | G06N 99/005 706/12 |
| 2011/0235925 A1* | 9/2011 | Itoh | ..................... | G06K 9/00771 382/218 |

OTHER PUBLICATIONS

R. Ferzli and L. J. Karam, "A No-Reference Objective Image Sharpness Metric Based on the Notion of Just Noticeable Blur (JNB)," IEEE Transactions on Image Processing, vol. 18, No. 4, pp. 717-728, Apr. 2009.
Ferzli et al., "A No-Reference Objective Image Sharpness Metric Based on Just-Noticeable Blur and Probability Summation," 14th IEEE International Conference on Image Processing, ICIP 2007, San Antonio, TX, United States, Sep. 16-19, 2007, pp. III-445-III-448.

* cited by examiner

*Primary Examiner* — Allen C Wong
(74) *Attorney, Agent, or Firm* — Athorus, PLLC

(57) ABSTRACT

Diagnostics may be performed on imaging devices such as digital cameras that are provided in large numbers, or mounted in arrays or networks, by providing imaging data captured from such devices to a machine learning system or classifier that has been trained to recognize anomalies based on imaging data. The machine learning system or classifier may be trained using a training set of imaging data previously captured by one or more imaging devices that has been labeled with regard to whether such imaging devices encountered any anomalies when the imaging data was captured, and if so, which anomalies were encountered. Additionally, a perceptual score which represents the quality of a given image or imaging data may be calculated and used to rank or define the image or imaging data in terms of quality, or determine whether the image or imaging data is suitable for its intended purpose.

17 Claims, 8 Drawing Sheets

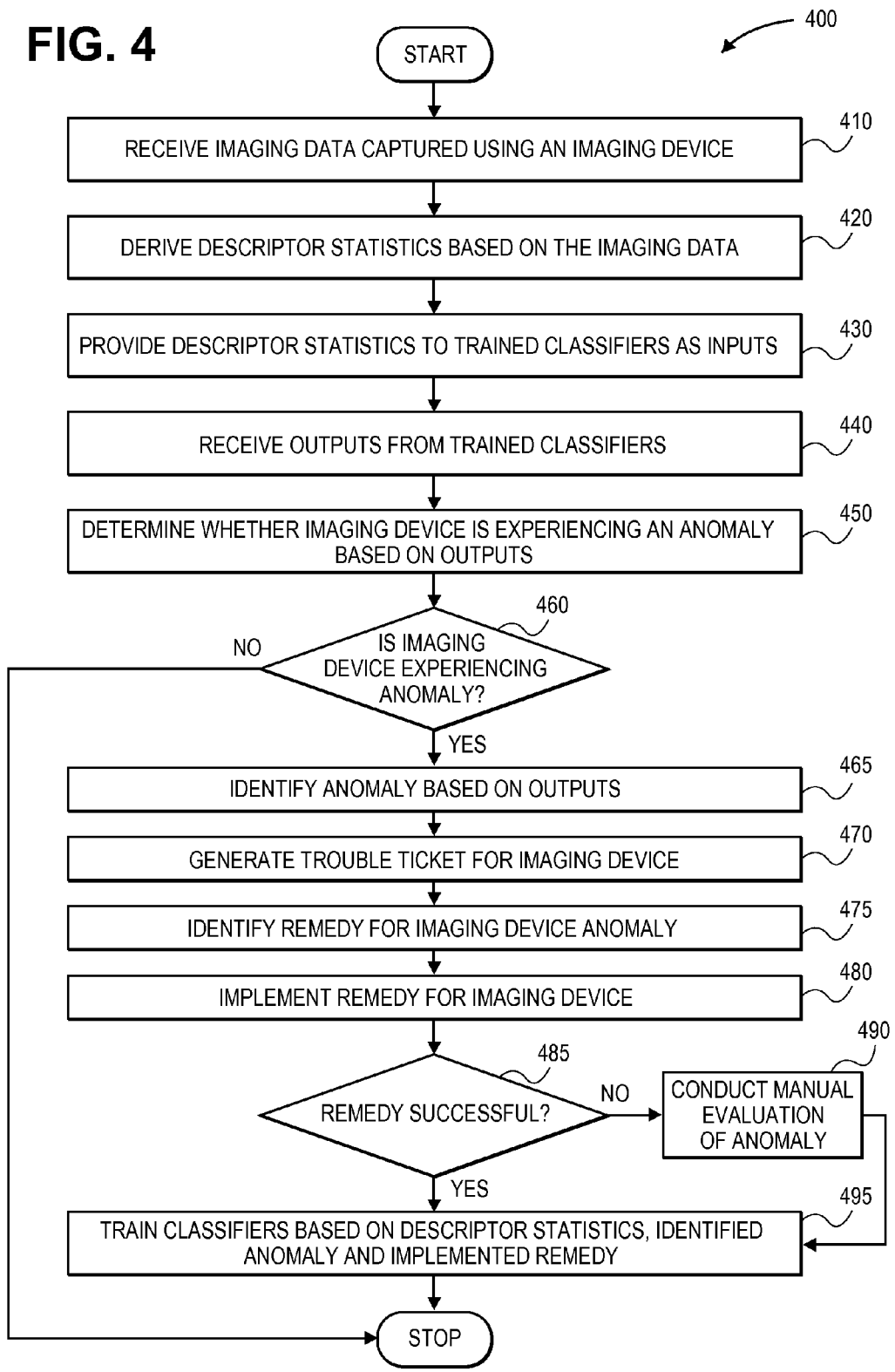

AUTOMATIC LARGE-SCALE IMAGING DEVICE DIAGNOSTICS

BACKGROUND

Imaging devices such as digital cameras are frequently used in a number of security or monitoring applications in facilities such as airports, stadiums or warehouses. For example, arrays or networks of cameras may be posted near security gates or terminals of an airport, at entryways or near focal points of a sports arena, or within or above receiving stations, storage areas or distribution stations of a fulfillment center or other distribution facility. Because imaging devices have decreased in cost and increased in quality in recent times, large numbers of such devices may be deployed in such facilities, enabling the capture, analysis or storage of still or moving images, or other information or data, regarding events, occurrences or ongoing operations at such facilities.

As with any high-technology equipment, imaging devices may be plagued by faults or discrepancies associated with one or more of their optical, electrical or mechanical components. Some of the faults or discrepancies that may be encountered may affect the quality of the images or other information or data sensed by such devices. Such faults or discrepancies may occur at random or upon the occurrence of one or more performance-related events, and may impact the clarity or quality of such images, information or data.

Unfortunately, where imaging devices are deployed in large numbers, it may be impractical, tedious and/or expensive to individually and manually assess each and every one of the imaging devices in order to determine when one or more of the faults or discrepancies has occurred. Moreover, problems affecting the capacity of an imaging device to focus on a subject, or to capture imaging information or data regarding the subject, may not be discovered and understood until feeds of such information or data are carefully evaluated. As a result, the many advantages provided by deploying imaging devices in an array or network, or in large numbers, may be frequently outweighed by the heightened demand for maintenance and inspections on such devices, and the increased amount of information or data that must be interpreted in order to identify such faults or discrepancies, in order to ensure that the quality of images or imaging data obtained by such devices is optimized or sufficient.

BRIEF DESCRIPTION OF THE DRAWINGS

FIG. 4 is a flow chart of one process for performing automatic large-scale imaging device diagnostics in accordance with embodiments of the present disclosure.

DETAILED DESCRIPTION

As is set forth in greater detail below, the present disclosure is directed to the automatic performance of diagnostic evaluations of imaging devices that are deployed on a large-scale basis. Specifically, the systems and methods disclosed herein derive descriptors from low-level pixel data statistics in order to reliably classify one or more sets of camera anomalies. For example, imaging information or data captured using one or more imaging devices may be provided to a machine learning tool or system along with identifiers of specific anomalies plaguing the imaging devices at a time when the information or data was captured, e.g., an anomaly status of each of the imaging devices, and the machine learning tool or system may be trained to recognize the various anomalies based on the information or data. Subsequently, other imaging information or data captured by the same imaging devices, or other imaging devices, may be provided to the trained machine learning tool or system, and analyzed in order to determine whether any anomalies, or which anomalies, are plaguing such imaging devices. Moreover, an analysis of such information or data may result in the calculation of a perceptual score or other quantified metric indicative of the quality of a given image or set of imaging data, thereby indicating whether the image or imaging data is of a suitable quality for use in one or more applications, e.g., whether the perceptual score exceeds a relevant predetermined threshold, or whether another image or imaging data may be required. In particular, the perceptual scores that are calculated in accordance with the present disclosure may be used to quantitatively represent differences between images that may not be perceived by the human eye.

Figure 1A:
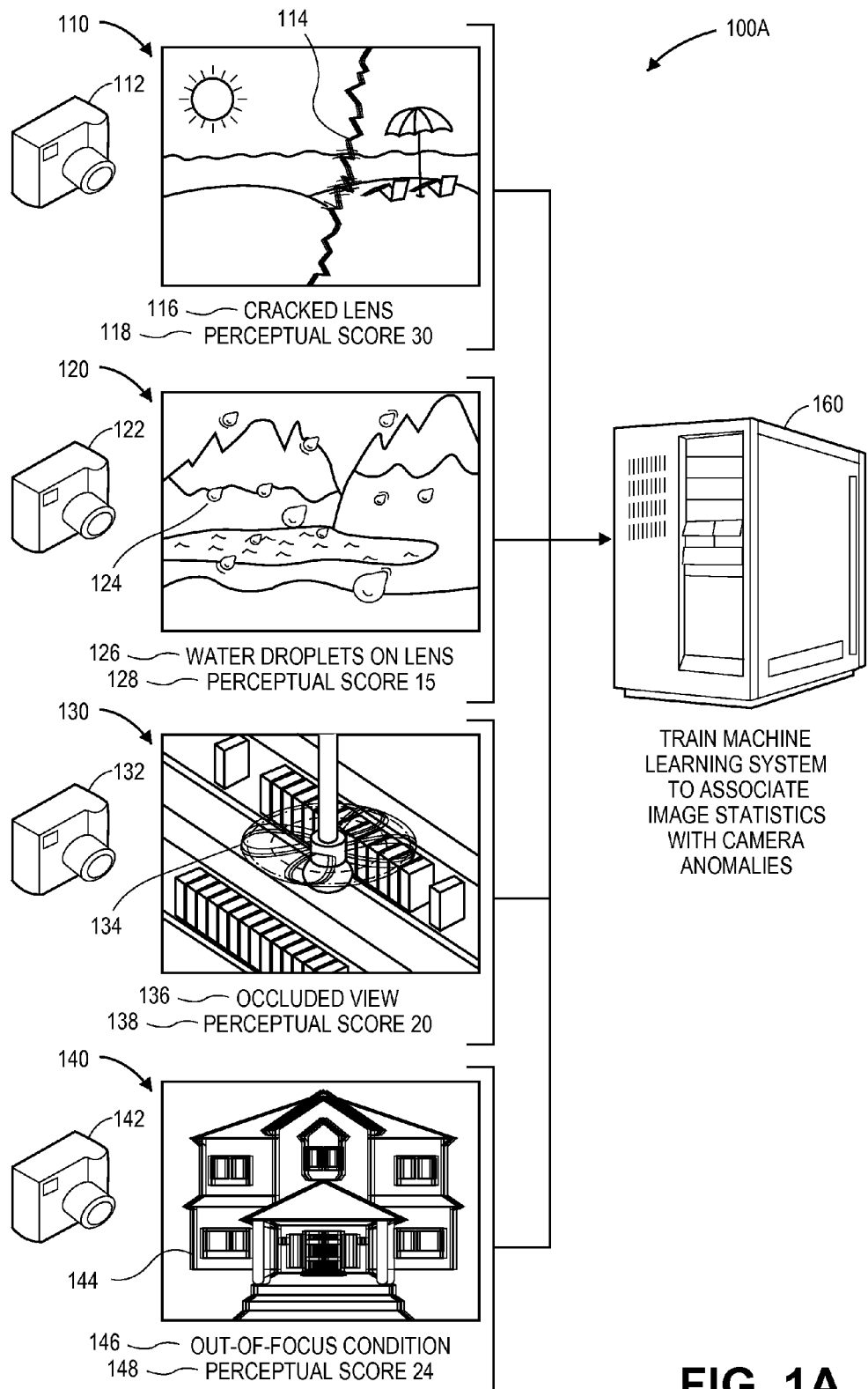
FIGS. 1A and 1B are views of components of one system for performing automatic large-scale imaging device diagnostics in accordance with embodiments of the present disclosure.
Figure 1B:
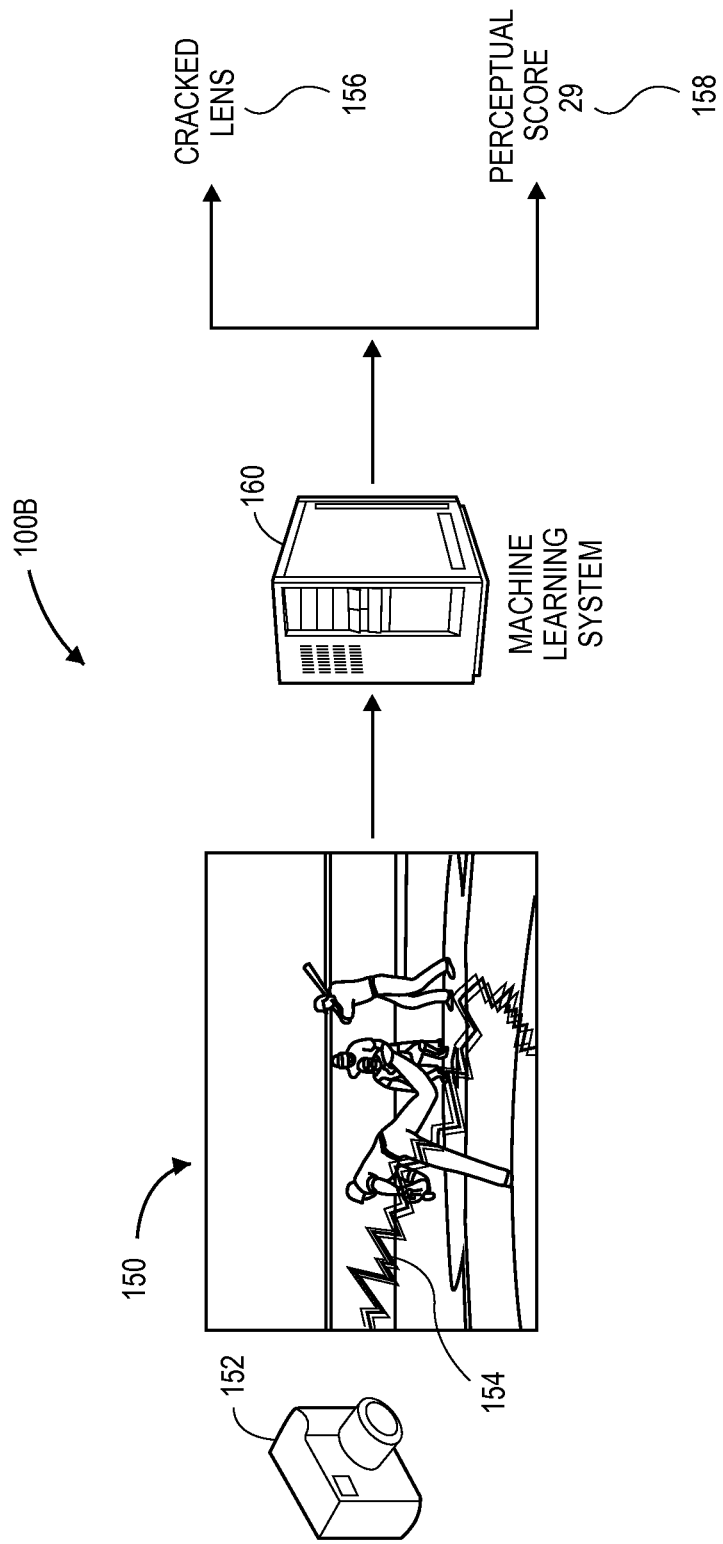

Referring to FIGS. 1A and 1B, components of one system 100A, 100B for performing automatic large-scale imaging device diagnostics using perceptual scores in accordance with embodiments of the present disclosure system are shown. As is shown in FIG. 1A, information or data regarding a plurality of images 110, 120, 130, 140 captured using imaging devices (e.g., digital cameras) 112, 122, 132, 142 is provided to a server 160 having a trainable machine learning system or classifier, e.g., a support vector machine, a linear regression machine, an artificial neural network or the like, operating thereon. Each of the images 110, 120, 130, 140 includes an associated defect 114, 124, 134, 144 as well as an identification of an anomaly 116, 126, 136, 146 that was affecting the imaging devices 112, 122, 132, 142 at a time when the information or data was captured, and a perceptual score 118, 128, 138, 148 calculated for the images 110, 120, 130, 140 based on the quality thereof.

For example, the image 110 was captured using an imaging device 112 having a cracked lens 116, and includes a visible defect 114 caused by the cracked lens 116. The perceptual score 118 for the image 110 is indicative of the reduced quality of the image 110. Similarly, the image 120 was captured using an imaging device 122 having water droplets 126 on a lens, and the image 130 was captured using an imaging device 132 with an occlusion 136 (viz., a ceiling fan obscuring a full view). The images 120, 130 include visible defects 124, 134 caused by the droplets and the ceiling fan, and the perceptual scores 128, 138 for the images 120, 130 are indicative of their reduced quality. The image 140 was captured using an imaging device 142 that was in an out-of-focus condition 146, and is visibly blurry 144, with a perceptual score 148 that is indicative of the reduced quality of the image 140, as well.

Once the machine learning system or classifier has been trained, imaging information or data may be provided to the machine learning system or classifier as inputs, and an output in the form of a determination as to whether an imaging device is experiencing any anomalies, e.g., as to an anomaly status of the imaging device, or an identification or a classification of such anomalies, may be returned. As is shown in FIG. 1B, information or data regarding an image 150 captured using an imaging device 152 is provided to a server 160 having the trained machine learning system or classifier operating thereon. The information or data indicates that a defect 154 mars at least a portion of the image 150. Once the information or data is provided to the server 160, outputs in the form of a perceptual score 158 indicative of the quality of the image and a predicated anomaly 156 that was adversely affecting the imaging device 152 at a time when the image 150 was captured may be returned.

Accordingly, by training a machine learning system or classifier using information or data regarding defects present in images or imaging data, as well as information or data regarding defects that may have been encountered by one or more imaging devices at times when such images or imaging data were captured, the systems and methods of the present disclosure may evaluate the operating conditions of other imaging devices in real time or in near-real time in the future by providing images or imaging data captured by such devices to the trained machine learning system or classifier as inputs. The imaging data provided to the trained machine learning system or classifier may include but is not limited to raw (e.g., unprocessed or unfiltered) image files corresponding to still or moving images, as well as any accompanying sounds or other media associated with such files, along with metadata such as dates or times when such imaging data was captured, aperture widths, exposure times, focal lengths or locations from which the imaging data was captured. The imaging data may further identify a type of sensor or a type of lens provided in the imaging device, or any other relevant operational characteristics of the imaging device. Outputs received from the trained machine learning system or classifier may be evaluated in order to determine not only whether a defect exists within the images or imaging data but also which defect may exist, and may take the form of a qualitative perceptual score indicative of the quality of the images or imaging data.

Many imaging devices, such as digital cameras, operate by capturing light that is reflected from objects, and subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a digital video recorder, or "DVR"), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in a digital image, including colors, textures or outlines of the features or objects, may be extracted from the image in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces. Furthermore, outlines of objects expressed in a digital image may be identified using one or more algorithms or machine-learning tools. Some such algorithms or tools may recognize edges, contours or outlines of objects in a digital image, or of portions of objects in the digital image, and may match the edges, contours or outlines of the objects against information regarding edges, contours or outlines of known objects, which may be stored in one or more data stores.

The use of large networks of digital cameras or other imaging devices for monitoring active and open environments such as those in a fulfillment center, a stadium or a public space (e.g., a transportation center, a shopping mall or a park) is increasingly common, based at least in part on not only the reduced costs of purchasing such devices but also the increased capacity of wired or wireless data networks to accommodate data that may be captured by such devices, including but not limited to still or moving images and associated content. Like any other camera or imaging device, however, the cameras or other imaging devices provided in such a network may be subject to anomalies which may adversely impact the quality of the images or other imaging data that may be captured thereby.

Imaging device anomalies and/or other hardware faults may occur at random or as a result of intentional or unintentional events occurring within a vicinity of an imaging device. For example, an improperly installed or aligned device may capture images that are blurred or out-of-focus, e.g., a failure to properly monitor or adjust the focus of the camera during or following installation. Moreover, even a properly installed or aligned imaging device may drift out-of-focus due to any mechanical vibrations that may be encountered during operation. Thus, where an imaging device features a fixed field of view, an unintentional or unanticipated adjustment of one or more components of the imaging device may cause blurry or marred aspects within the field of view to drift or grow over time.

Additionally, depending on the conditions in which an array or network of imaging devices is deployed, such as an industrial or commercial environment, the lenses or other equipment may be impacted by dust, moisture or other airborne impurities, or subject to adverse lighting conditions. A lens surface may also be marred by fingerprints, smudges or other like impediments. Likewise, where a large number of imaging devices are operated for extended periods of time, such imaging devices may be subject to long-term degradation of sensors or other optical equipment due to incident sunlight, reflections, bright spots or specularities, thereby saturating the sensors and causing glares in images captured thereby. Where an imaging device is associated with a computer or connected to a network, the imaging device may experience anomalies related to the availability of processing power, data storage or network connectivity or bandwidth, as well.

Also, where an imaging device is mounted in a crowded space with one or more structures or objects obstructing or cluttering the field of view of the imaging device, including but not limited to columns, beams, girders, overhead fans or hanging lights, such structures or objects may appear blurry in a foreground, and people, structures or objects which were the intended targets of the imaging devices may appear blurry in a background. Finally, images or imaging data captured by an imaging device may appear grainy due to any other issues affecting not only optical equipment (e.g., lenses or sensors) but also any processing equipment or computers associated with the imaging device.

Unfortunately, there are no practical means to detect and diagnose anomalies plaguing one or more imaging devices of an array or network. Where a lag exists between a time when an anomaly manifests, and a time when the anomaly is detected, the images and/or imaging data captured by such imaging devices may be rendered functionally useless for business purposes. Further, the operation of the imaging devices to capture the images or imaging data, the storage of such images or imaging data in one or more data stores, and the transmission of such images or imaging data over one or more networks will have been collectively wasteful uses of processing power, storage capacity or bandwidth.

Typically, quality of an image or imaging data is usually assessed in one of two ways. First, quality of an image may be determined by comparing the image to a reference image according to one or more standard metrics, such as a Mean Square Error (MSE) analysis, a Peak Signal-to-Noise Ratio (PSNR) analysis or a Structural Similarity Index (SSI) to estimate an extent of blurring or other degrading effects of a camera anomaly. However, by their very nature, such metrics require the use of a normalized, blur-free or noiseless image to act as a reference for imaging data captured by an imaging device. In many situations in which large numbers of imaging devices are provided, however, no such reference image is available. Moreover, a separate reference image may be required for each of the imaging devices. Next, quality of an image may be determined by non-reference measures such as kurtosis techniques, derivatives, edge widths, pixel variances, intensity histograms, power spectrums or wavelets. However, none of these techniques may apparently be used to quantify a level of quality of image data captured by large numbers of imaging devices deployed in arrays or networks, or encompass imaging device anomalies such as occlusion, sensor saturation, blurring or out-of-focus lenses.

The systems and methods of the present disclosure are directed to reliably identifying and assessing anomalies associated with one or more of a potentially large number of imaging devices which may be encountered during normal operation. Such anomalies may be identified and assessed by one or more statistical methods or means, such as by training a machine learning system or classifier, e.g., a support vector machine, a linear regression model, K-means clustering techniques, nearest neighbor analyses or an artificial neural network. The machine learning system or classifier may be trained using statistical descriptors that are derived from low-level image or pixel statistics obtained from images or imaging data and provided to the machine learning system or classifier in association with imaging device anomalies.

For example, a support vector machine, or "SVM," is a classifier that operates by defining a hyperplane in two or more dimensions that separates data into two categories or classes. Predictive variables known as attributes may be transformed into features in order to define the hyperplane, with the process of choosing the most suitable representation being referred to as feature selection, and a set of features (e.g., predictive variables) being referred to as a vector. Thus, support vector machines are directed to identifying the most optimal hyperplane that separates a cluster of vectors such that vectors of one category are on one side of a hyperplane and vectors of another category are on the other side of the hyperplane. The vectors nearest the hyperplane are known as support vectors.

Any number of statistical descriptors may be provided to a machine learning system or classifier in accordance with the present disclosure. For example, a variance of absolute values of a Laplacian operator, e.g., a two-dimensional isotropic measure of a second spatial derivative of an image, may be used to calculate a descriptor based on second-order derivatives to capture high spatial frequencies, such as those that may be associated with sharp edges or features of an image. Likewise, an image may be convolved using a Laplacian operator, and a descriptor may be calculated based on a sum of the resultant absolute values over a window of defined pixel dimensions. A Tenengrad descriptor may be based on a local sum of a square of gradients, and may use a Sobel operator to determine strengths of horizontal and vertical gradients. Such a descriptor may also be formulated as a sum of gradient magnitudes that exceed a predetermined acuity threshold. Further, a modified Tenengrad descriptor may consider a variance of the sum of squares of Sobel gradients, thereby defining a more discriminative measure while increasing a level of responsiveness to noise. Anomalies such as sensor saturation, blurring, blooming or overexposure may lead to a reduction in modified Tenengrad values.

Descriptors may also be calculated based on variances of pixel values over an entire image, which decrease as blurriness in an image decreases, or as edges or sharp features are smoothed, or pixel contrasts, e.g., differences between a pixel and each of its neighbors, as summed over an entire image, which may be used to detect low-clarity images due to layers of dust, water, fingerprints or other impurities on a lens. Descriptors may be further calculated as ratios between energies of high-pass bands and low-pass bands of energy extracted from an image, e.g., Chebyshev moments of a normalized image, which may be used to accurately reconstruct intensity distributions, as well as histogram entropy, or measures of information content of all pixels of an image, with low probabilities of occurrence contributing to high entropies and vice versa. Because sharper images, as well as images that are captured using clean lenses or unoccluded images, typically contain widely varying numbers of pixel values, the pixels of such images have statistically lower probabilities of occurrence, and higher levels of entropy.

The various descriptors identified above, or other descriptors, may be calculated relatively quickly and efficiently for each image or set of imaging data captured by an imaging device, with the objective of determining whether the imaging device is experiencing any anomalies, e.g., an anomaly status of the imaging device, and, if so, which anomaly is being experienced. A machine learning system or classifier may be provided with a training set comprising a variety of images or sets of imaging data obtained from anomaly-free imaging devices, and a variety of images or sets of imaging data obtained from imaging devices experiencing one or more anomalies. Where an image or set of imaging data is obtained from an imaging device experiencing an anomaly, the images or the set of imaging data may be labeled with the type or category of the anomaly, e.g., a cracked lens, water vapor or other moisture on a lens, poor focusing or the like. Additionally, prior to commencing a training session, a subset of the training set, or a test set of images or imaging data, may be set aside and used to evaluate the efficacy of the training session. Those of ordinary skill in the pertinent arts will readily recognize that the systems and methods of the present disclosure are not limited to any of the particular descriptors described herein.

The training set may be provided for the purpose of training a machine learning system, a classifier or other statistical algorithm to recognize an anomaly plaguing an imaging device based on imaging data captured from the imaging device. For example, a training set comprising imaging data and labeled anomalies may be provided to the classifier or other algorithm as inputs and outputs, respectively, in order to train the classifier or other algorithm to recognize the association between the imaging data and the respectively associated anomalies. The classifier or algorithm may be trained to recognize when imaging data includes, or does not include, evidence of an anomaly affecting the imaging device and to identify the anomaly based on the imaging data.

More particularly, according to some embodiments, a classifier may be trained to recognize associations between imaging data and imaging device anomalies by providing a first group (e.g., the training set) of historically observed patterns of imaging defects and labeled imaging device anomalies as inputs and outputs, respectively, either in series or in parallel. The capacity to recognize such associations may be validated by providing a second group or set of historically observed patterns of such defects and anomalies (e.g., the test set) to the classifier. By evaluating the classifier using the test set, which includes one or more patterns of defects and anomalies that are different from the patterns that were used to train the classifier, i.e., by training and testing the classifier using different sets of patterns, a more accurate and relevant measure of the classifier's performance may be obtained.

The analyses disclosed herein may be provided in real time, or in near-real time, with regard to the ongoing operation of a plurality of imaging devices (e.g., cameras), i.e., to identify which imaging devices may be experiencing one or more anomalies, and to identify the anomalies being experienced by such imaging devices, as well as to calculate perceptual scores for images or imaging data captured by such imaging devices. Alternatively, such analyses may be provided forensically, i.e., in retrospect, or after the fact, with regard to the operation of the plurality of imaging devices, and may be used to identify imaging device anomalies based on images or imaging data captured by such devices over time.

The systems and methods disclosed herein may provide a number of advantages over systems and methods of the prior art. For example, such systems and methods may automatically estimate camera data quality and visual acuity using a perceptual score that truly represents perceptual quality of images or imaging data captured using an imaging device, thereby determining whether the images or the imaging data may be utilized for image-based object detection, recognition, or classification in large settings. Additionally, the systems and methods disclosed herein may automatically, e.g., persistently or periodically, monitor the quality of images captured from large numbers of imaging devices and may generate notifications regarding the functional health of such imaging devices. Further, the systems and methods disclosed herein may supplement efforts to remove blurring, or to rectify blurry images, captured using one or more imaging devices that are experiencing anomalies until maintenance or repairs may be made to such imaging devices.

The systems and methods of the present disclosure may be used to quantify and measure imaging data feed quality during operation, installation or repair procedures, or to recommend or initiate such procedures in real time or near-real time. Moreover, such systems and methods may guide the detection and correction of imaging device poses in order to maximize clarity and minimize the effects of clutter or adverse lighting conditions. Likewise, the systems and methods disclosed herein may be used to immediately notify personnel when an imaging device is damaged, or becomes out-of-focus, for any reason by way of a real time or near-real time analysis of imaging feeds received from the imaging device.

Figure 2:
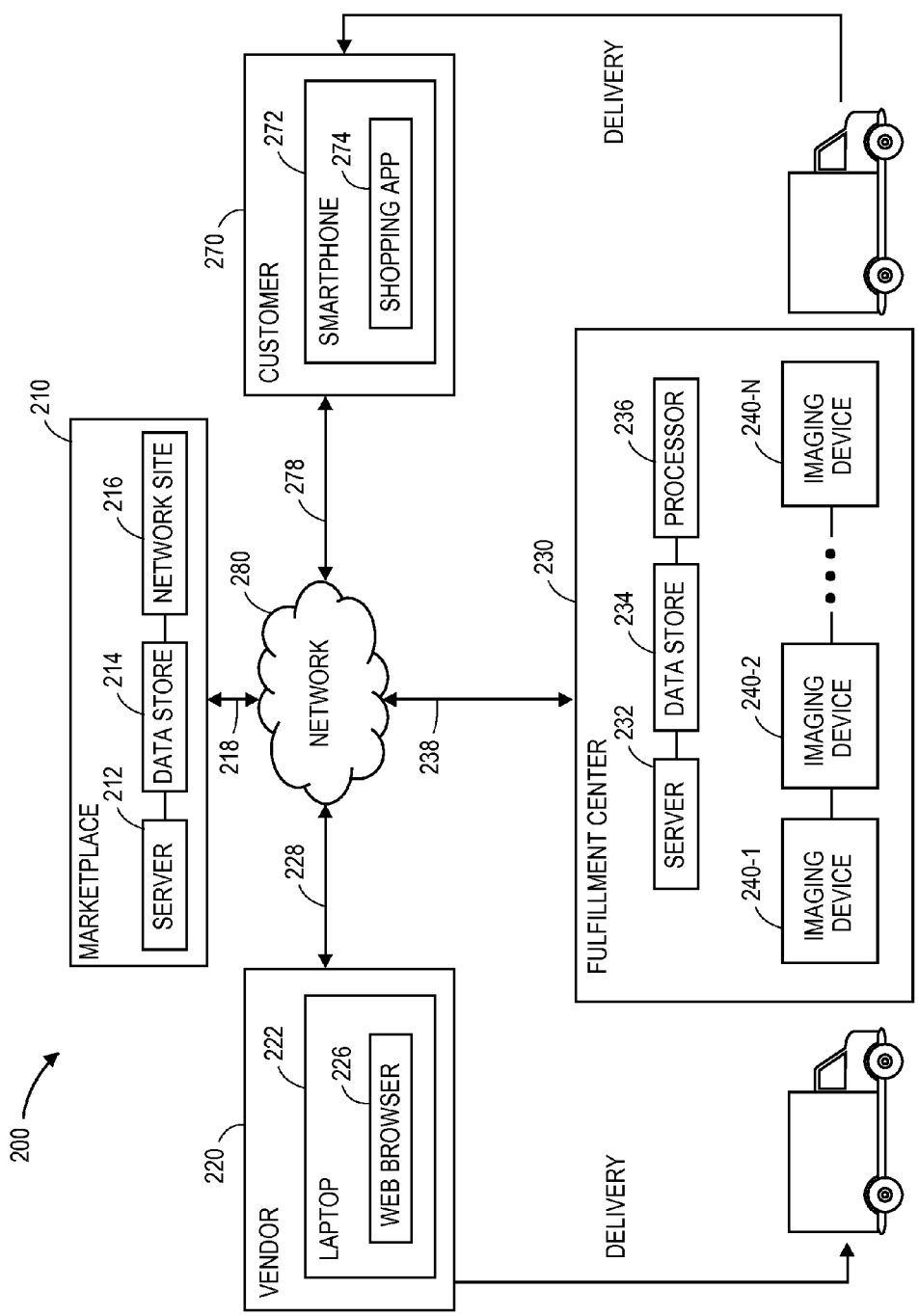
FIG. 2 is a block diagram of components of one system for performing automatic large-scale imaging device diagnostics in accordance with embodiments of the present disclosure.

Referring to FIG. 2, a block diagram of components of one system 200 for performing large-scale imaging device diagnostics is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data stores 214 may contain any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 226, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers, such as one or more receiving stations, storage areas and distribution stations. The fulfillment center 230 further includes n imaging devices 240-1, 240-2 . . . 240-n.

The imaging devices 240-1, 240-2 . . . 240-n may comprise any form of optical recording device that may be used to photograph or otherwise record images of structures, facilities or other elements within the fulfillment center 230, as well as the items within the fulfillment center 230, or for any other purpose. Such imaging devices 240-1, 240-2 . . . 240-n may capture one or more still or moving images, as well as any relevant audio signals or other information, within one or more designated locations within the fulfillment center 230, and may be connected to the server 232 or with one another by way of an internal network (not shown). Additionally, the imaging devices 240-1, 240-2 . . . 240-n may be adapted or otherwise configured to communicate with one another, or with the marketplace 210 or the marketplace server 212, the vendor 220 or the vendor laptop 222 or the customer 270 or customer smartphone 272, or to access one or more other computer devices by way of the external network 280, over the internal network 240. Although the warehouse 210 of FIG. 2 includes three boxes corresponding to imaging devices 240-1, 240-2 . . . 240-n, any number or type of imaging devices may be provided in accordance with the present disclosure, including but not limited to digital cameras or other optical sensors.

The fulfillment center 230 may further operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with the imaging devices 240-1, 240-2 . . . 240-*n*. Such control systems may also be associated with one or more other computing devices or machines, and may communicate with the marketplace 210, the vendor 220 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center" or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including E-mail or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the laptop computer 222, the desktop computer 232, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232 or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of imaging devices, e.g., digital cameras, deployed in an array or network within a fulfillment center environment, the systems and methods are not so limited.

Rather, the systems and methods disclosed herein may be utilized in any environment in which the monitoring of the operation of any number of imaging devices is desired.

Figure 3:
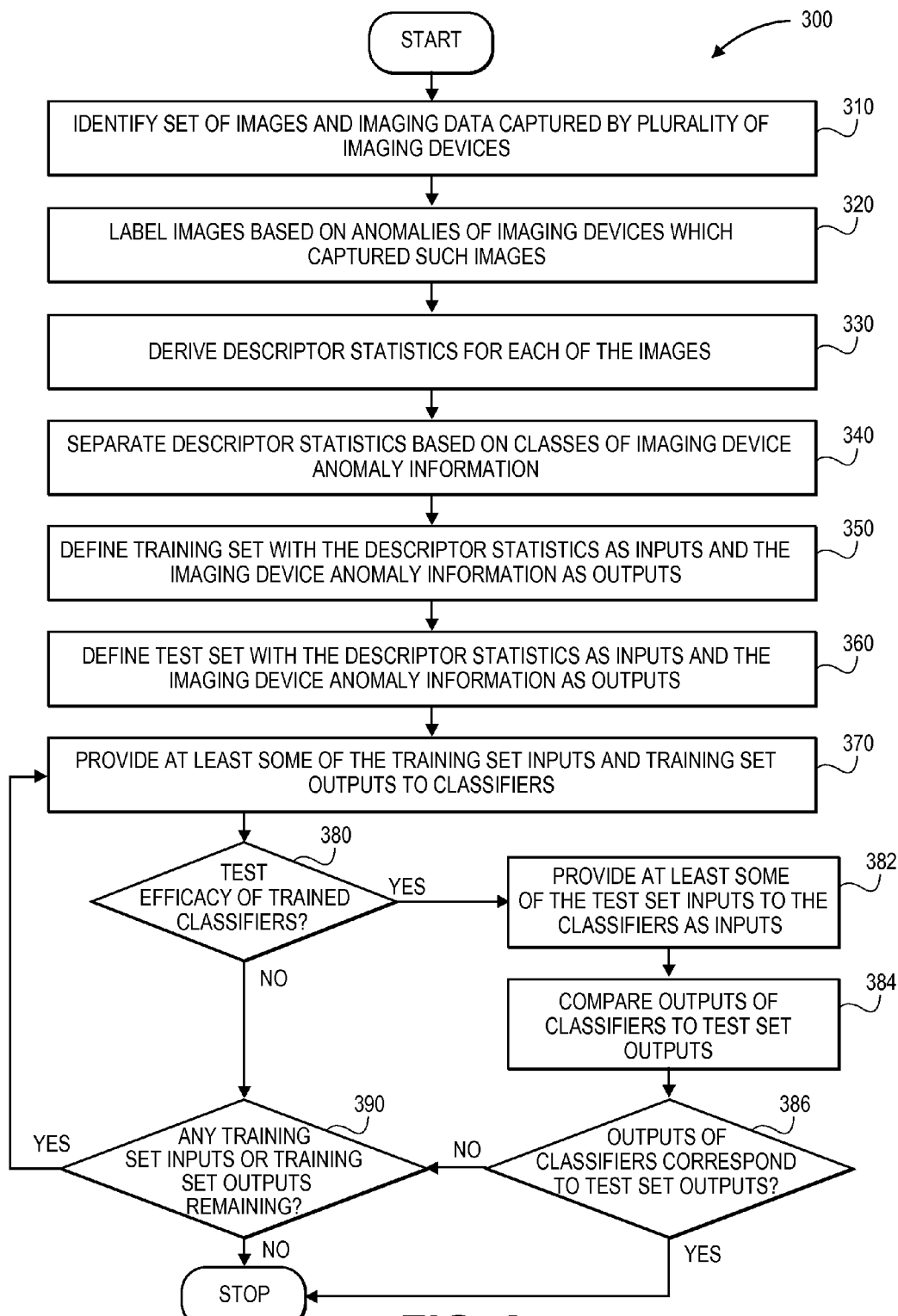
FIG. 3 is a flow chart of one process for performing automatic large-scale imaging device diagnostics in accordance with embodiments of the present disclosure.

Referring to FIG. 3, a flow chart 300 representing one embodiment of a process for performing automatic large-scale imaging device diagnostics in accordance with embodiments of the present disclosure is shown. At box 310, a set of images captured by a plurality of imaging devices and imaging data is identified. For example, images captured by digital cameras mounted within a transportation center and various other metadata (e.g., data regarding the various pixels of such images, which may be real or normalized, as well as data identifying an imaging device which captured the image, a location of the imaging device, or any other pertinent data) may be identified.

At box 320, the images and imaging data are labeled based on any anomalies that may be encountered by the imaging devices that captured the images or imaging data. For example, an image or imaging data may be labeled as having been captured using an imaging device that is not experiencing any anomalies. Alternatively, the image or the imaging data may be labeled as having been captured by an imaging device that is out-of-focus, or has a dusty or fouled lens, water droplets or fingerprints on the lens, a saturated sensor, an occluded or cluttered view, or noise or compression artifacts. Moreover, the image or imaging data may be labeled as having been captured by an imaging device experiencing adverse lighting conditions or one or more anomalies related to computer processing, computer storage or network connectivity or bandwidth. Labels associated with any number or type of imaging device anomalies may be applied to images or imaging data, as applicable, as labels.

At box 330, descriptor statistics are derived for each of the images. For example, as is discussed above, descriptors or descriptor statistics such as variances of absolute values of a Laplacian operator, a sum of the resultant absolute values over a window of defined pixel dimensions, a Tenengrad descriptor or modified Tenengrad descriptors, variances of pixel values over an entire image, pixel contrasts, ratios between energies of high-pass bands and low-pass bands of energy extracted from an image, histogram entropies or the like may be calculated based on pixel data or image data. Any type or form of descriptor or descriptor statistic may be utilized in accordance with the present disclosure.

At box 340, the descriptor statistics corresponding to each of the images are separated into classes corresponding to the respective imaging device anomaly information. For example, a class of images or imaging data captured from imaging devices not experiencing any anomalies may be defined, along with classes of images or imaging data captured from imaging devices experiencing one or more particular anomalies.

At box 350, a training set may be defined based on the classified imaging data, with the descriptor statistics as inputs and the corresponding imaging device anomaly information as outputs. Similarly, at box 360, a test set may also be defined based on the classified imaging data, with the descriptor statistics as inputs and the corresponding imaging device anomaly information as outputs. For example, a comparatively large portion of the descriptor statistics and corresponding anomaly information may be set aside for the purpose of training a machine learning system, while a smaller portion of the descriptor statistics and anomaly information may be set aside to act as a test set for determining or confirming the efficacy of the training process.

At box 370, at least some of the training set inputs and training set outputs may be provided to one or more classifiers or other machine learning systems. The training set may be provided to a machine learning system operating on a computer having one or more processors for executing a training evolution and one or more storage devices for storing the training set and/or any results or other relevant data or information regarding the training evolution. Additionally, the imaging data of the training set may be preprocessed prior to the training evolution, e.g., reformatted or augmented in order to enable the machine learning system to be more effectively applied, in a manner that reduces the dimensionality or complexity of the imaging data or the training evolution, or otherwise identifies the most appropriate or representative elements of the imaging data. The training of the machine learning system may be directed to one or more standard functions, including pattern classification, regression, clustering or the like.

According to some embodiments of the present disclosure, the classifiers may include one or more support vector machines for defining decision patterns based on a variety of inputs. For example, a support vector machine may be trained to recognize and separate images or imaging data captured using imaging devices without anomalies, from images or imaging data captured using imaging devices with one or more anomalies. Likewise, another support vector machine may be trained to recognize images or imaging data captured using an imaging device experiencing a specific anomaly from images or imaging data captured using imaging devices experiencing any other anomalies. Any number of support vector machines or other classifiers may be provided in accordance with the present disclosure for the purpose of identifying and classifying images or imaging data based on the presence or absence of an imaging device anomaly in accordance with the present disclosure.

At box 380, whether the efficacy of the trained classifiers is to be tested is determined. For example, the classifiers that are trained at box 370 by receiving descriptor statistics or other imaging data as inputs and labeled imaging device anomalies as outputs may be verified on a schedule, e.g., after a predetermined number or percentage of the images or imaging data and imaging device anomalies in the training set have been provided to the classifiers for training purposes, or after a predetermined amount or duration of time. If the efficacy of the trained classifiers is to be tested, then the process advances to box 382, where at least some of the test set inputs are provided to the classifiers as inputs. At box 384, the outputs from the classifiers are compared to the test set outputs. If the outputs of the classifier correspond to the test set outputs, e.g., above a predetermined threshold or to a predetermined extent, then the classifiers may be deemed properly trained, and the process ends.

If the classifier outputs do not correspond to the test set outputs, e.g., above the predetermined threshold or to the predetermined extent, or if the efficacy of the trained classifiers is not to be tested, then the process advances to box 390, where the system determines whether any of the training set inputs or training set outputs remain. If any of the training set inputs or training set outputs have not yet been provided to the classifiers, then the process returns to box 370. If each of the training set inputs and training set outputs has been provided to the classifiers, however, then the process ends.

Accordingly, one or more classifiers may be trained to recognize images or imaging data that was captured using an imaging device without any anomalies, as well as images or imaging data that was captured using imaging devices having any number of anomalies, using a training set of imaging data and labeled anomalies. Once the classifiers have been trained, imaging data may be provided to the trained classifier, and whether the imaging device that captured the imaging data is plagued by an anomaly, or which anomaly, may be determined based on the imaging data.

Referring to FIG. 4, a flow chart 400 representing one embodiment of a process for performing automatic large-scale imaging device diagnostics in accordance with embodiments of the present disclosure is shown. At box 410, imaging data captured using an imaging device is received, and at box 420, descriptor statistics are derived based on the imaging data. For example, any type or form of descriptors or descriptor statistics, including but not limited to any of the descriptors described above, e.g., variances of absolute values of a Laplacian operator, sums of resultant absolute values over a window of defined pixel dimensions, Tenengrad descriptors or modified Tenengrad descriptors, variances of pixel values over an entire image, pixel contrasts, ratios between energies of high-pass bands and low-pass bands of energy extracted from an image, histogram entropies or the like, may be calculated based on the imaging data.

At box 430, the descriptor statistics are provided to trained classifiers as inputs. The classifiers may be trained according to one or more processes, e.g., the process represented in the flow chart 300 of FIG. 3, and using imaging data captured from one or more imaging devices and labeled according to whether such imaging devices were experiencing any anomalies, such that the classifiers are enabled to recognize an anomaly based on the descriptors. At box 440, outputs are received from the trained classifiers, and whether the imaging device that captured the imaging data at box 410 is experiencing an anomaly may be determined based on such outputs. If the imaging device is not experiencing an anomaly, then the process ends.

If the imaging device is experiencing an anomaly, however, then the process advances to box 465, where the anomaly is identified based on the outputs, and to box 470, where a trouble ticket is generated for the imaging device. For example, the trained classifiers may correlate the descriptor statistics with one or more anomalies, and may store a record indicative of the imaging device and any related metadata, e.g., a time or date on which the anomaly was identified, in association with the imaging device in at least one data store. The record may augment any other information or data regarding the imaging device, which may indicate an emerging issue with the imaging device, or may represent evidence of a long-term trend affecting the performance of the imaging device.

At box 475, a remedy for the anomaly is identified, and at box 480, the remedy is implemented for the imaging device. For example, where the anomaly is identified as a cracked lens, an appointment to replace the lens may be scheduled. Where the anomaly is a dusty or otherwise fouled lens, then maintenance evaluations for cleaning the lens and purifying the air within the environment in which the lens is provided may be performed. Where the anomaly relates to a computer device or network connection associated with the imaging device, one or more diagnostic evaluations may be performed on the imaging device or any computer devices or networks of which the imaging device is a part. Any type or form of suitable remedy that may be identified for the anomaly may be implemented, as necessary.

At box 485, if the remedy is deemed successful, then the process advances to box 495, where feedback regarding the implemented remedy, the descriptor statistics and the identified anomaly is provided to the classifiers for further retraining. In this regard, information regarding the remedy may be used to confirm whether the anomaly has been properly identified from outputs received from the trained classifiers based on the descriptor statistics, and to further guide the identification of anomalies in the future. If the remedy is not successful, however, then the process advances to box 490, where a manual evaluation of the anomaly is conducted, and to box 495, where feedback regarding the implemented remedy, the descriptor statistics and the identified anomaly is provided to the classifiers for further retraining.

Figure 5A:
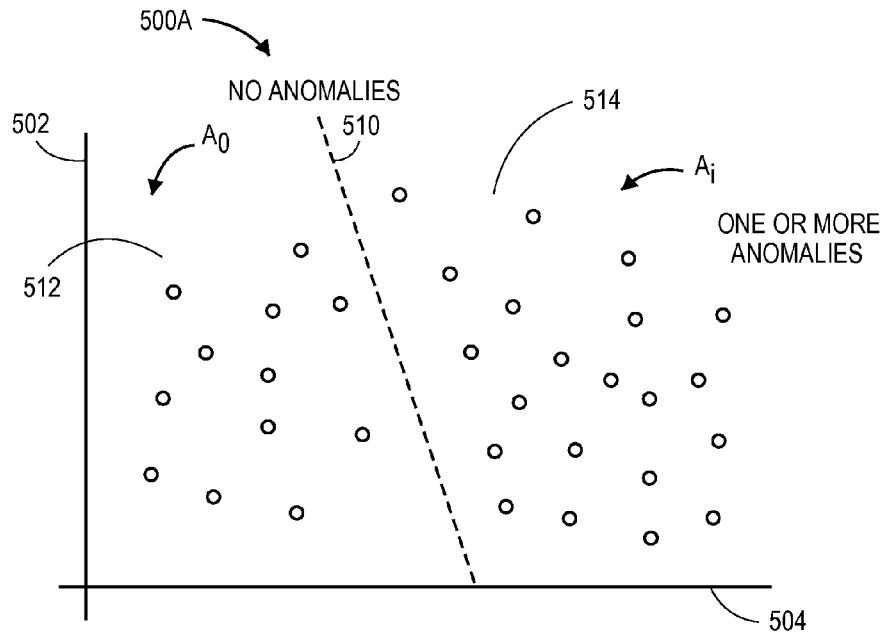
FIGS. 5A and 5B are plots of data considered by systems or processes for performing automatic large-scale imaging device diagnostics in accordance with embodiments of the present disclosure.
Figure 5B:
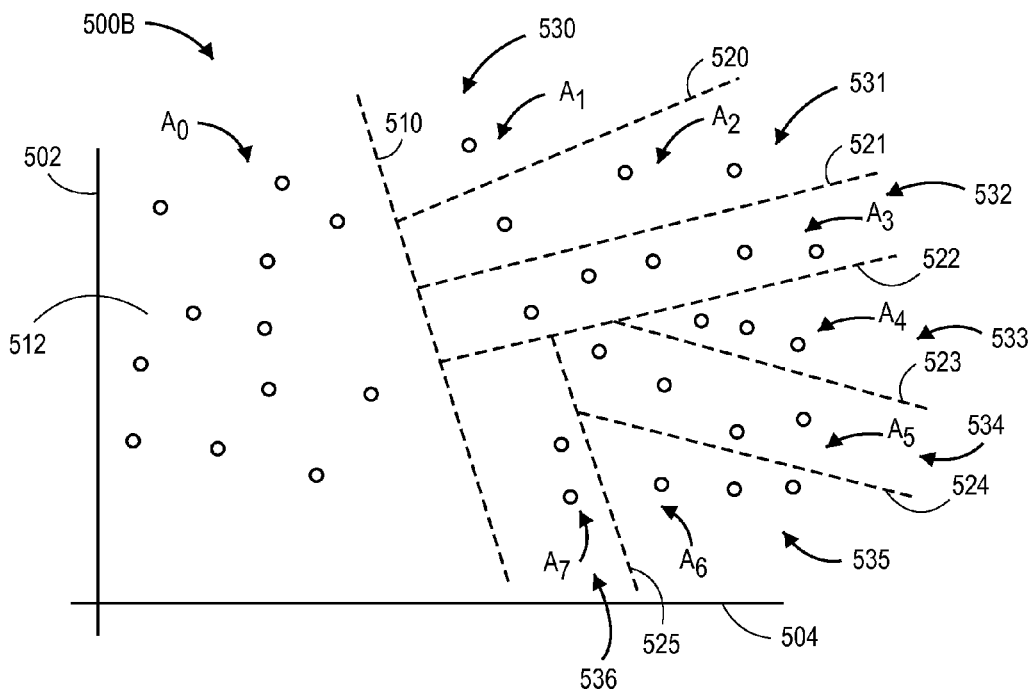

Accordingly, the systems and methods of the present disclosure may use one or more trained classifiers or other machine learning systems to not only determine whether an imaging device that captured an image or other imaging data may be experiencing an anomaly but also identify the anomaly and a remedy for the anomaly. According to some embodiments, support vector machines may be provided in series to sets of imaging data in order to determine first whether an imaging device is experiencing an anomaly and then to separate each of a plurality of anomaly classes from one another. Referring to FIGS. 5A and 5B, sets of imaging data 500A, 500B are shown. Referring to FIG. 5A, the set of imaging data 500A is divided by a single hyperplane 510 into categories 512, 514 or clusters of vectors for which the imaging devices which captured such imaging data are not experiencing anomalies, viz., $A_0$, and for which the imaging devices which captured such imaging data are experiencing one or more anomalies, viz., $A_i$. The location of the hyperplane 510 of FIG. 5A with respect to the imaging data may be identified using any type or form of support vector machine or other classifier.

Additionally, where imaging data is determined to have been captured using an imaging device facing at least one anomaly, the systems and methods disclosed herein may be used to determine the specific anomaly or anomalies with which the imaging device has been afflicted. Referring to FIG. 5B, the set of imaging data 500A of FIG. 5A is shown as further divided by a plurality of hyperplanes 510, 520, 521, 522, 523, 524, 525 into categories 512, 530, 531, 532, 533, 534, 535, 536 or clusters of vectors. As is shown in FIG. 5B, the category 512 includes the cluster of vectors for which imaging devices which captured such imaging data are not experiencing anomalies, viz., $A_0$, and clusters of vectors corresponding to one or more specific anomalies, viz., $A_1$, $A_2$, $A_3$, $A_4$, $A_5$, $A_6$, $A_7$. For example, such clusters may correspond to an out-of-focus or otherwise blurry imaging device, a dusty, foggy or smudged lens, fingerprints, water droplets or dirt patches on lenses, a saturated sensor, an occluded or cluttered view, a noisy artifact, a computer-related anomaly or any other type of anomaly. Additionally, the hyperplanes 520, 521, 522, 523, 524, 525 may further be located with respect to the imaging data 500B using a multiclass ranking support vector machine, e.g., a support vector machine in which a single decision function classifies all classes of data, or, alternatively, a "one-against-all" classifier, in which a single binary support vector machine is provided for each class for the purpose of separating the members of that class from members of other classes, or a pairwise classifier, in which a single binary support vector machine is provided for each pair of classes. Any type of classifier, including but not limited to support vector machines, may be utilized for the purpose of determining whether an imaging device that captured imaging data is experiencing any anomalies, or to identify such anomalies, in accordance with the present disclosure.

Figure 6:
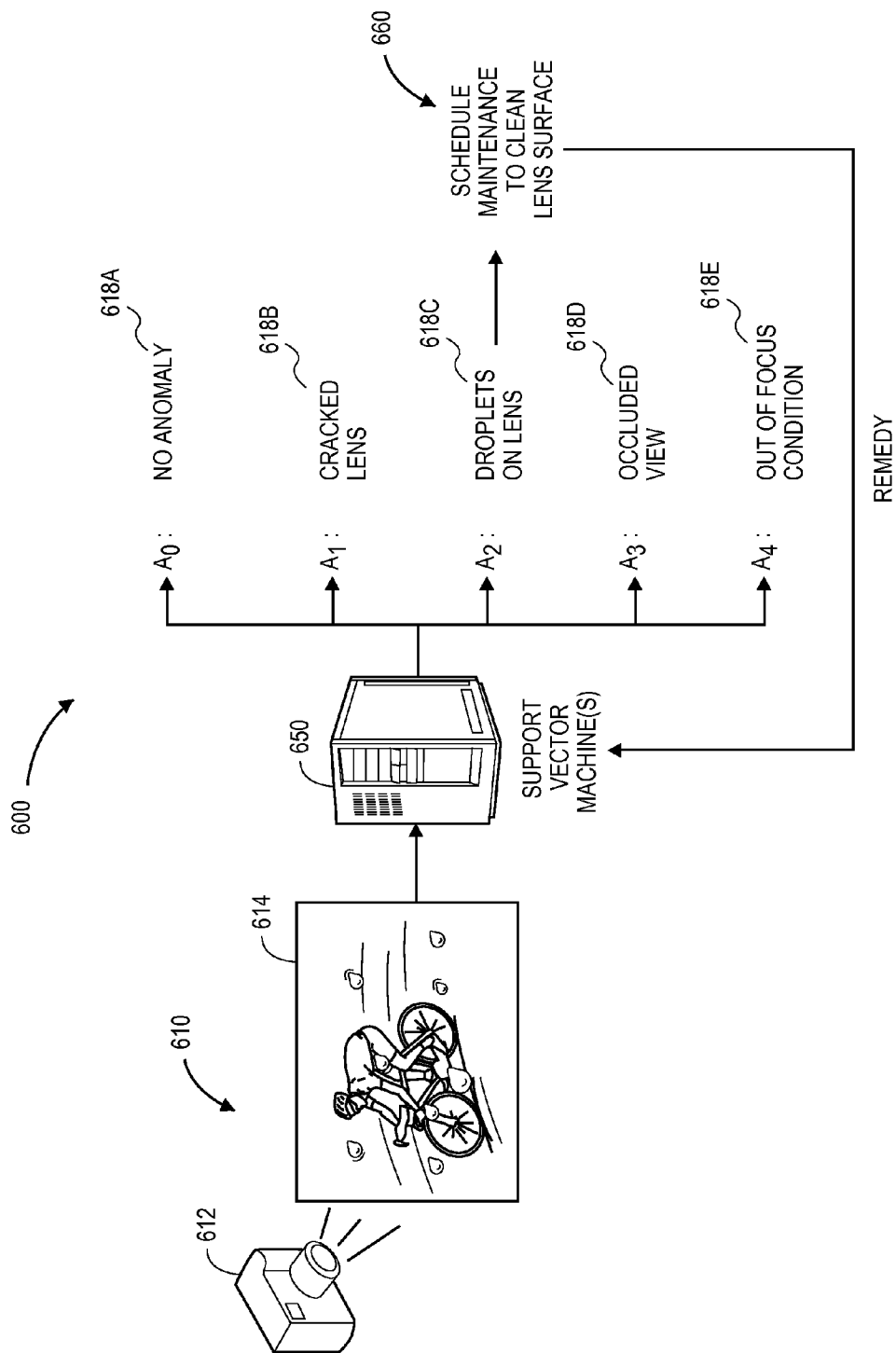
FIG. 6 is a flow diagram of one system for performing automatic large-scale imaging device diagnostics in accordance with embodiments of the present disclosure.

When an anomaly is identified for an imaging device based on imaging data captured by the imaging device using one or more classifiers, and when a remedy is selected for addressing the anomaly, the efficacy of the remedy may be determined. Subsequently, information regarding the anomaly and the efficacy of the remedy may be returned to the classifiers in order to further enhance the precision with which such classifiers may identify a correct anomaly based on a given set of imaging data. Referring to FIG. 6, a flow diagram of one system 600 for performing automatic large-scale imaging device diagnostics in accordance with embodiments of the present disclosure is shown.

As is shown in FIG. 6, an image 610 captured using an imaging device 612 includes a defect 614, viz., blurring or distortions caused by water droplets on a lens of the imaging device 612. Imaging data may include raw or processed pixel data associated with the image 610, sounds or other media, operational information regarding the imaging device 612, as well as any other types of metadata. The imaging data may be provided to a support vector machine 650 or other classifier that has been trained in accordance with embodiments of the present disclosure, such as the processes represented in the flow charts 300, 400 of FIGS. 3 and 4, to recognize one or more anomalies of imaging devices based on the imaging data. For example, the support vector machine may have been trained to parse vectors corresponding to imaging data into a cluster or a category representative of no anomalies, or clusters or categories representative of one or more individual anomalies, e.g., out-of-focus or otherwise blurry imaging devices, lenses fouled with dust, fingerprints, water or dirt, saturated sensors, occluded or cluttered views, adverse lighting conditions or one or more computer-related issues, using one or more hyperplanes, such as is shown in FIGS. 5A and 5B.

Once the imaging data regarding the image 610 has been evaluated, the support vector machine 650 may determine whether such imaging data is indicative of one or more of a plurality of anomalies and, if so, which anomaly may be identified from the imaging data. For example, as is shown in FIG. 6, the support vector machine 650 may determine whether the imaging device 612 is not experiencing any anomalies 618A, viz., cluster $A_0$, or whether the imaging device 612 is experiencing a cracked lens 618B, viz., cluster $A_1$; whether the imaging device 612 has water droplets on its lens 618C, viz., cluster $A_2$; whether the imaging device 612 has an occluded view 618D, viz., $A_3$; or whether the imaging device 612 is in an out-of-focus condition 618E, viz., $A_4$. Although FIG. 6 includes just five clusters or categories associated with anomalies, viz., a "no anomaly" cluster or category 618A and clusters or categories 618B, 618C, 618D, 618E associated with four discrete anomalies, which may be selected by the support vector machine 650 based on the imaging data, those of ordinary skill in the pertinent art will recognize that clusters or categories corresponding to any number of anomalies may be identified and associated with an imaging device in accordance with the present disclosure.

Upon determining that the imaging device 610 is experiencing one of the anomalies 618B, 618C, 618D, 618E based on the imaging data regarding the image 612, a remedy for the selected anomaly 618B, 618C, 618D, 618E may be identified. For example, as is shown in FIG. 6, where it is determined that the imaging device 612 was plagued by water droplets on its lens at a time when the image 610 was captured, a remedy 660 may include scheduling maintenance to wipe or otherwise clean a surface of the lens. Information regarding the remedy 660, the anomaly 618C and the imaging device 612 may be returned to the support vector machine 650, not only to confirm the efficacy of the remedy 660 with regard to other imaging data captured by the imaging device 612 but also, once the efficacy of the remedy 660 has been confirmed, to identify the remedy 660 for any other imaging devices that capture imaging data indicative of the defect 614, or similar defects, and provide such imaging data to the support vector machine 650 in the future.

As is discussed above, the systems and methods of the present disclosure may also generate a quantitative score, e.g., a perceptual score, that is reflective of the overall quality of an image or a set of imaging data captured by an imaging device. A perceptual score may be calculated by any statistical method, e.g., a linear regression model, which utilizes parameters that may be determined using a training set of imaging data, and defined using any type, form or number of descriptor statistics or other relevant information. For example, a properly trained linear regression model may consider any type or form of imaging data and return a quantitative perceptual score that aggregates the impact of the individual aspects of such imaging data on overall imaging quality. An image having a higher perceptual score than another image, for example, may be deemed to be of higher quality than the other image. Conversely, an image having a lower perceptual score than another image may be deemed to be of lower quality than the other image. The perceptual score may thus be used to determine whether an image is suitable for use in a given application, e.g., whether the image clearly and accurately depicts subjects appearing in a field of view of an imaging device, such as by comparing the perceptual score to a relevant minimum threshold.

Figure 7:
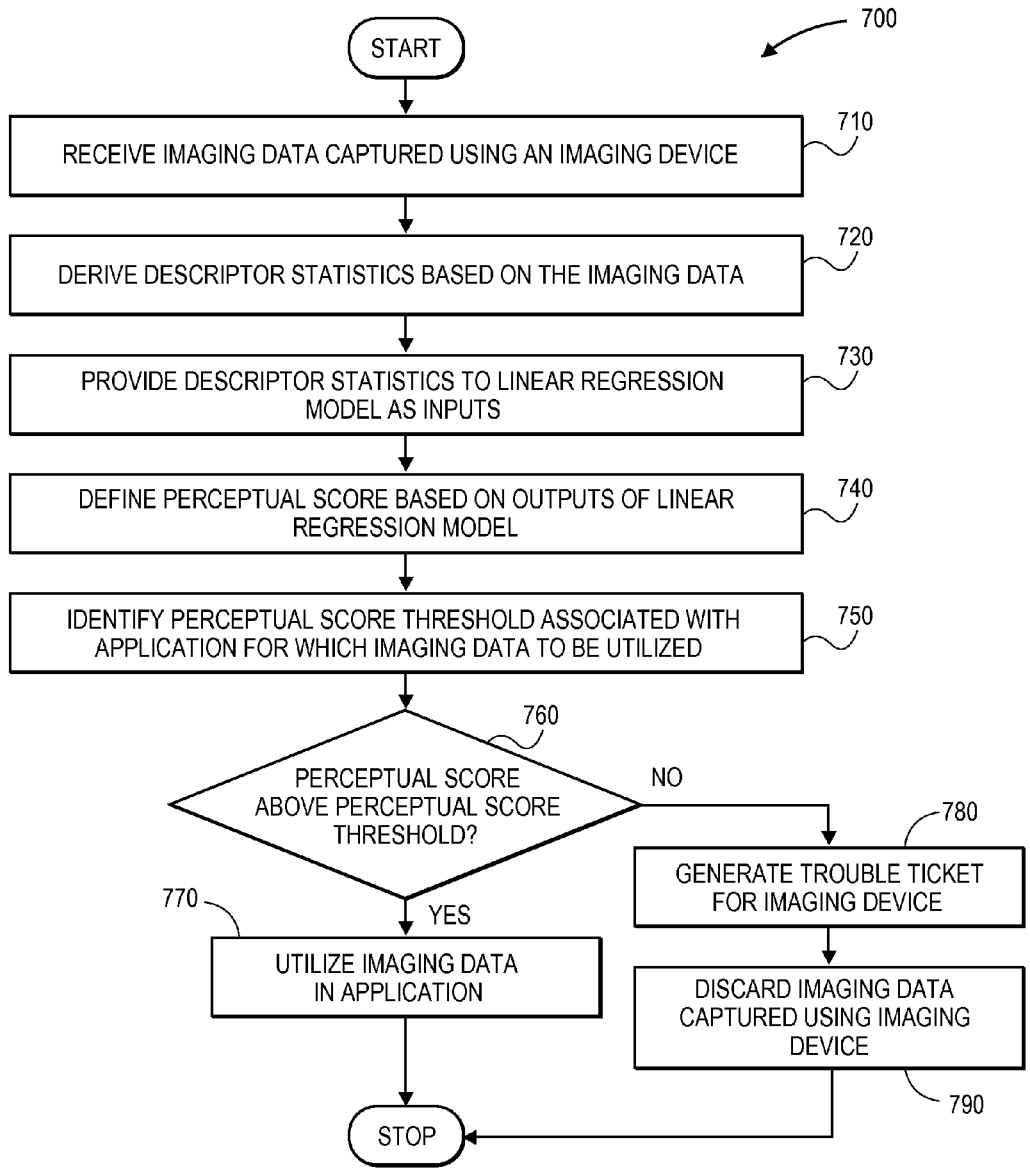
FIG. 7 is a flow chart of one process for performing automatic large-scale imaging device diagnostics in accordance with embodiments of the present disclosure.

Referring to FIG. 7, a flow chart 700 representing one embodiment of a process for performing automatic large-scale imaging device diagnostics in accordance with embodiments of the present disclosure is shown. At box 710, imaging data captured using an imaging device is received, and at box 720, descriptor statistics are derived based on the imaging data. For example, the imaging data may include raw or processed images, as well as any other relevant information or data, e.g., metadata, regarding the imaging data or the imaging device from which such data was captured. Such descriptors may be derived from low-level image or pixel statistics obtained from images or imaging data, including but not limited to variances of absolute values of a Laplacian operator, sums of resultant absolute values over a window of defined pixel dimensions, Tenengrad descriptors or modified Tenengrad descriptors, variances of pixel values, pixel contrasts, ratios between energies of high-pass bands and low-pass bands of energy extracted from images, histogram entropies or the like. Any type or form of descriptor statistics that may be derived from images or imaging data may be utilized in accordance with the present disclosure.

At box 730, the descriptor statistics are provided to a linear regression model as inputs. Such descriptors may be formed into vectors and provided to the linear regression model for the purpose of recognizing or predicting and quantifying defects that may be expressed in or otherwise described by the descriptor statistics. The linear regression model may have been trained using a training set that fits the model for the purpose of predicting a response value from one or more predictors of the training set, according to one or more statistical or mathematical tools or techniques, including loss functions such as a sum of squares of errors (or "SSE"), a residual sum of squares (or "RSS"), a sum of absolute errors (or "SAE"), or any other like means. Those of ordinary skill in the pertinent art will recognize that any other approaches for modeling relationships between imaging data, in addition to linear regression models, may be utilized in accordance with the present disclosure.

At box 740, a perceptual score is defined based on the outputs of the linear regression model. The perceptual score may be a result of the aggregate and/or weighted impacts of the various descriptor statistics on imaging data quality. For example, the linear regression model may weight pixel value variances, which are indicative of sharp or smooth edges or features within images, more heavily than histogram entropies, which are indicative of pixel variety within images, when determining the perceptual score.

At box 750, a perceptual score threshold may be associated with an application for which the imaging data is to be utilized. The perceptual score threshold may be a function of the criticality of the application, e.g., monitoring security at a vault or airport may have a higher perceptual score threshold than monitoring compliance with a stop sign or traffic signal, as well as any available processing power, data storage capacity or bandwidth.

At box 760, if the perceptual score defined at box 740 exceeds a perceptual score threshold, then the process advances to box 770, where the imaging data is utilized in the given application. For example, if an image captured by a security camera at an automated teller machine has a perceptual score indicating that a bank customer may be clearly identified in the image, then the image may be stored in association with information regarding a customer who executed a given transaction, and the process ends. If the perceptual score does not exceed the threshold associated with the application, then the process advances to box 780, where a trouble ticket is generated for the imaging device, and to box 790, where the imaging data is discarded. The trouble ticket may qualitatively indicate that maintenance or repair to the imaging device is required or, alternatively, may suggest a specific type or form of maintenance or repair for the imaging device based on the perceptual score. Additionally, the timing of any associated maintenance or repairs may also be driven by the perceptual score, or trends observed regarding the perceptual score. For example, where a perceptual score regarding a given image is below a threshold associated with an application by a small amount, or where perceptual scores for images captured by a given imaging device are observed to be falling slowly over time, maintenance or repairs to the imaging device may be scheduled at the convenience of one or more workers. Where a perceptual score is well below a threshold associated with an application, however, or where the perceptual scores for images captured by the given imaging device are observed to be falling rapidly over time, then the maintenance or repairs to the imaging device should be scheduled promptly.

The perceptual scores calculated in accordance with the present disclosure may have any number of uses in imaging device applications of any scope or scale. For example, a perceptual score may be used to determine the quality of barcode scanner data, e.g., images or imaging data relating to one or more bar codes, and to predict the outcome of a barcode decoding or reading algorithm based on the imaging quality as represented by the perceptual score. Running an evaluative metric on an image of a barcode and generating an imaging score thereby may be effectively used to ascertain whether an output of a computationally intensive and expensive barcode decoding or reading process will succeed or fail in advance. Likewise, the perceptual scores referenced herein may be applied to evaluate the quality of images provided by users of a network site, e.g., vendors of an online marketplace, such as the vendor 220 of the marketplace 210 of FIG. 2, who may furnish such images for posting on a web site, such as the network site 216 of FIG. 2. If an image is too blurry, noisy or cluttered to be of value, or would otherwise degrade the quality of a user's experience with the web site, the image may be automatically rejected or returned to a user who provided it.

The perceptual scores may be further utilized to determine when an image should be taken from an imaging device or camera installed on a moving platform, e.g., a vehicle or a robot, or from an imaging device or camera which may be reasonably anticipated to include moving objects within their respective fields of view, e.g., security cameras posted within a train station. For example, frame rates may be increased or decreased accordingly. A perceptual score may also be used to automatically adjust a focal length in an imaging device to account for different depth planes, in order to maximize the capturing of relevant content in one or more areas of interest, or to ignore blurring or defects in other portions of the fields of view.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the use of digital cameras posted in security applications, the systems and methods disclosed herein are not so limited, and may be utilized along with any type of imaging device applied for any purpose.

Those skilled in the pertinent arts will recognize that the systems and methods disclosed herein are not limited to a single form of machine learning system or classifier, e.g., a support vector machine or linear regression model. Rather, any form of machine learning system or classifier, or any number of such systems or classifiers, may be provided in accordance with the present disclosure for the purpose of recognizing anomalies of imaging devices based on imaging data captured by such imaging devices, or for quantitatively evaluating imaging data captured by such imaging devices.

Although some of the embodiments described herein describe specific systems or methods for capturing images or imaging data from imaging devices, specific anomalies that may be encountered by such devices, or specific remedies for such anomalies or specific means for calculating perceptual scores, the systems and methods of the present disclosure are not so limited, and may be used with any systems and methods for accomplishing the results disclosed herein. Additionally, such systems or methods may be used in series or in parallel, and independently or in conjunction with one another, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 4 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale, particularly regarding the relative locations of aspects or elements of the network delivery systems disclosed herein to one another in vertical and/or horizontal space.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A computer-implemented method comprising:
   identifying imaging data regarding a set of images, wherein each of the set of images was captured by one of a plurality of imaging devices;
   determining an anomaly status of each of the plurality of imaging devices at times when each of the set of images was captured;
   training at least one classifier using the imaging data and the anomaly status for each of the set of images;
   capturing a first image using a first imaging device;
   providing data regarding the first image as an input to the trained at least one classifier, wherein the data regarding the first image comprises at least one descriptor statistic;
   calculating a perceptual score for the first image based at least in part on the at least one descriptor statistic;
   receiving an output from the trained at least one classifier;
   determining whether the first imaging device is experiencing an anomaly based at least in part on the output received from the trained at least one classifier;
   upon determining that the first imaging device is experiencing the anomaly,
      identifying the anomaly based at least in part on the output received from the trained at least one classifier.

2. The computer-implemented method of claim 1, wherein the at least one descriptor statistic is one of:
   a variance of absolute values of a Laplacian operator defined based at least in part on the data;
   a sum of resultant absolute values defined based at least in part on the data;
   a sum of a square of gradients defined based at least in part on the data;
   a variance of pixel values defined based at least in part on the data;
   a ratio of energies defined based at least in part on the data; or
   a histogram entropy defined based at least in part on the data.

3. The computer-implemented method of claim 1, wherein the anomaly is at least one of:
   an out-of-focus condition of the first imaging device;
   fouling on a lens of the first imaging device;
   moisture on the lens of the first imaging device;
   at least one fingerprint on the lens of the first imaging device;
   a saturated sensor on the first imaging device;
   an occluded view of the first imaging device;
   image degradation by the first imaging device;
   an adverse lighting condition of the first imaging device; or
   a network connectivity issue of the first imaging device.

4. The computer-implemented method of claim 1, wherein the at least one descriptor statistic comprises at least one of:

a variance of absolute pixel values of a Laplacian operator defined based at least in part on the first set of imaging data;

a sum of resultant absolute pixel values defined based at least in part on the first set of imaging data;

a sum of a square of pixel value gradients defined based at least in part on the first set of imaging data;

a variance of pixel values defined based at least in part on the first set of imaging data;

a ratio of pixel energies defined based at least in part on the first set of imaging data; or a histogram entropy defined based at least in part on the first set of imaging data.

5. A computer-implemented method comprising:

identifying a first set of imaging data captured using a first imaging device;

calculating at least one descriptor statistic based at least in part on the first set of imaging data;

calculating a perceptual score based at least in part on the at least one descriptor statistic;

providing a first input to at least one classifier, wherein the first input is based at least in part on the first set of imaging data, wherein the first input comprises the at least one descriptor statistic;

identifying a first output from the at least one classifier based at least in part on the first input; and determining, based at least in part on the first output, whether the first imaging device is experiencing an anomaly.

6. The computer-implemented method of claim 5, further comprising:

upon determining that the first imaging device is experiencing the anomaly, identifying the anomaly based at least in part on the first output from the at least one classifier.

7. The computer-implemented method of claim 5, further comprising:

defining a training set of imaging data captured using at least one of a plurality of imaging devices;

labeling the training set of imaging data with anomaly statuses of the at least one of the plurality of imaging devices; and training the at least one classifier using at least a portion of the labeled training set.

8. The computer-implemented method of claim 5, wherein the at least one classifier comprises at least one support vector machine, wherein the at least one support vector machine comprises at least one of:

a multiclass ranking support vector machine; or a single binary support vector machine configured to select the anomaly from a plurality of anomalies based at least in part on the first set of imaging data.

9. The computer-implemented method of claim 5, wherein the first set of imaging data comprises at least one of:

a raw image;

a processed image;

a date on which the imaging data was captured;

a time at which the imaging data was captured;

a location of the first imaging device at the time;

an aperture width of the first imaging device at the time;

an exposure time of the first imaging device at the time;

a focal length of the first imaging device at the time;

a type of sensor associated with the first imaging device; or a type of lens associated with the first imaging device.

10. The computer-implemented method of claim 5, wherein determining, based at least in part on the first output, whether the first imaging device is experiencing the anomaly comprises:

identifying a plurality of categories of anomaly statuses defined by the at least one classifier, wherein one of the anomaly statuses is not associated with any of a plurality of anomalies;

associating the first output with one of the plurality of categories; and determining whether the anomaly status of the one of the plurality of categories is not associated with any of the plurality of anomalies.

11. The computer-implemented method of claim 10, further comprising:

identifying the anomaly status of the one of the plurality of categories, wherein the anomaly is associated with the anomaly status of the one of the plurality of categories.

12. A computer-implemented method comprising:

defining a training set of imaging data captured using at least one of a plurality of imaging devices;

labeling the training set of imaging data with anomaly statuses of the at least one of the plurality of imaging devices;

training the at least one classifier using at least a portion of the labeled training set;

identifying a first set of imaging data captured using a first imaging device;

providing a first input to at least one classifier, wherein the first input is based at least in part on the first set of imaging data;

identifying a first output from the at least one classifier based at least in part on the first input; and determining, based at least in part on the first output, whether the first imaging device is experiencing an anomaly, wherein training the at least one classifier comprises:

generating a plurality of vectors corresponding to imaging data of the training set;

defining at least one hyperplane of the plurality of vectors corresponding to the imaging data of the training set; and defining at least one cluster of the plurality of vectors based at least in part on the at least one hyperplane.

13. A computer-implemented method comprising:

defining a training set of imaging data captured using at least one of a plurality of imaging devices;

labeling the training set of imaging data with anomaly statuses of the at least one of the plurality of imaging devices;

training the at least one classifier using at least a portion of the labeled training set;

defining a test set comprising at least one test input and at least one test output, wherein the at least one test input comprises imaging data captured using at least one of the plurality of imaging devices, and wherein the at least one test output is defined based at least in part on an anomaly status of the at least one of the plurality of imaging devices;

providing the at least one test input of the test set to the at least one classifier;

identifying an output from the at least one classifier in response to the at least one test input of the test set;

comparing the output to the at least one test output of the test set;

identifying a first set of imaging data captured using a first imaging device;
providing a first input to at least one classifier, wherein the first input is based at least in part on the first set of imaging data;
identifying a first output from the at least one classifier based at least in part on the first input; and
determining, based at least in part on the first output, whether the first imaging device is experiencing an anomaly.

14. A monitoring system comprising:
a plurality of imaging devices; and
a computing device in communication with at least one of the plurality of imaging devices,
wherein the computing device is configured to at least:
identify imaging data captured by one of the plurality of imaging devices;
provide an input to a machine learning tool, wherein the input is based at least in part on the imaging data;
receive an output from the machine learning tool; and
define a perceptual score for the imaging data based at least in part on the output, wherein the perceptual score is a quantitative measure of a quality of the imaging data.

15. The monitoring system of claim 14, wherein the computing device is further configured to at least:
identify a perceptual score threshold associated with an application; and
determine whether the perceptual score defined for the imaging data exceeds the perceptual score threshold associated with the application.

16. The monitoring system of claim 14, wherein the computing device is further configured to at least:
calculate at least one descriptor statistic based at least in part on the imaging data, wherein the at least one descriptor statistic comprises at least one of:
a variance of absolute pixel values of a Laplacian operator;
a sum of resultant absolute pixel values;
a sum of a square of pixel value gradients;
a variance of pixel values;
a ratio of pixel energies; or
a histogram entropy, and
wherein the input comprises the at least one descriptor statistic.

17. The monitoring system of claim 14, wherein the machine learning tool is a trained linear regression model.

* * * * *